(12) United States Patent
Saito et al.

(10) Patent No.: US 10,023,238 B2
(45) Date of Patent: Jul. 17, 2018

(54) SKELETAL COMPONENT FOR AUTOMOBILE AND FRONT PILLAR LOWER INCLUDING THE SAME

(71) Applicant: NIPPON STEEL & SUMITOMO METAL CORPORATION, Tokyo (JP)

(72) Inventors: Masahiro Saito, Futtsu (JP); Yoshiaki Nakazawa, Takarazuka (JP); Kenichiro Otsuka, Kisarazu (JP); Yasuhiro Ito, Amagasaki (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 21 days.

(21) Appl. No.: 15/111,488

(22) PCT Filed: Feb. 3, 2015

(86) PCT No.: PCT/JP2015/000452
§ 371 (c)(1),
(2) Date: Jul. 14, 2016

(87) PCT Pub. No.: WO2015/118852
PCT Pub. Date: Aug. 13, 2015

(65) Prior Publication Data
US 2016/0332669 A1  Nov. 17, 2016

(30) Foreign Application Priority Data
Feb. 4, 2014  (JP) ................................. 2014-019538

(51) Int. Cl.
B62D 25/04 (2006.01)
B62D 21/15 (2006.01)
B62D 25/02 (2006.01)

(52) U.S. Cl.
CPC ............. *B62D 25/04* (2013.01); *B62D 21/15* (2013.01); *B62D 25/025* (2013.01)

(58) Field of Classification Search
CPC .... B62D 21/15; B62D 21/152; B62D 25/025; B62D 25/04; B62D 25/2036
(Continued)

(56) References Cited

U.S. PATENT DOCUMENTS 4,550,948 A * 11/1985 Hamada ................. B62D 27/02
296/202
8,888,173 B2 * 11/2014 Nydam ................ B62D 25/025
296/187.12
(Continued)

FOREIGN PATENT DOCUMENTS

JP   2000-177630   6/2000
JP   2001-253365   9/2001
(Continued)

*Primary Examiner* — Jason S Daniels
(74) *Attorney, Agent, or Firm* — Clark & Brody

(57) ABSTRACT

A front pillar lower outer includes a bent portion, and a first region and a second region, and is a skeletal component for automobile that is assumed to receive a collision load along the extending direction of the first region. The outer is constituted by attaching a first member that is arranged on a first region side, and a second member that is arranged on a second region side. An attachment line of the both members is arranged in a predetermined zone between a first boundary and a second boundary. The plate thickness of the first member is larger than the plate thickness of the second member.

12 Claims, 9 Drawing Sheets

(58) Field of Classification Search
USPC ................. 296/193.05, 193.06, 202, 209
See application file for complete search history.

(56) References Cited

U.S. PATENT DOCUMENTS

| | | | | |
|---|---|---|---|---|
| 2012/0119546 A1* | 5/2012 | Honda | ................. | B62D 25/025 296/203.01 |
| 2016/0039466 A1* | 2/2016 | Yamamoto | ............. | B62D 25/04 296/193.06 |
| 2016/0052552 A1* | 2/2016 | Yamamoto | ........... | B62D 25/025 296/187.1 |

FOREIGN PATENT DOCUMENTS

| JP | 2011-037291 | 2/2011 |
|---|---|---|
| JP | 2012-232315 | 11/2012 |
| JP | 5103959 | 12/2012 |
| JP | 2013-001226 | 1/2013 |
| JP | 2013-141928 | 7/2013 |

\* cited by examiner

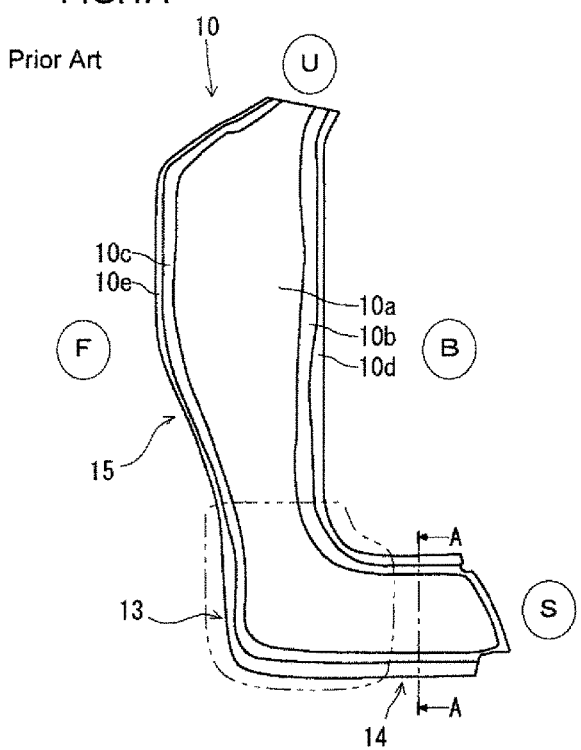
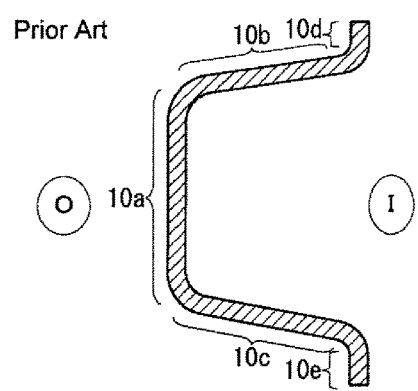

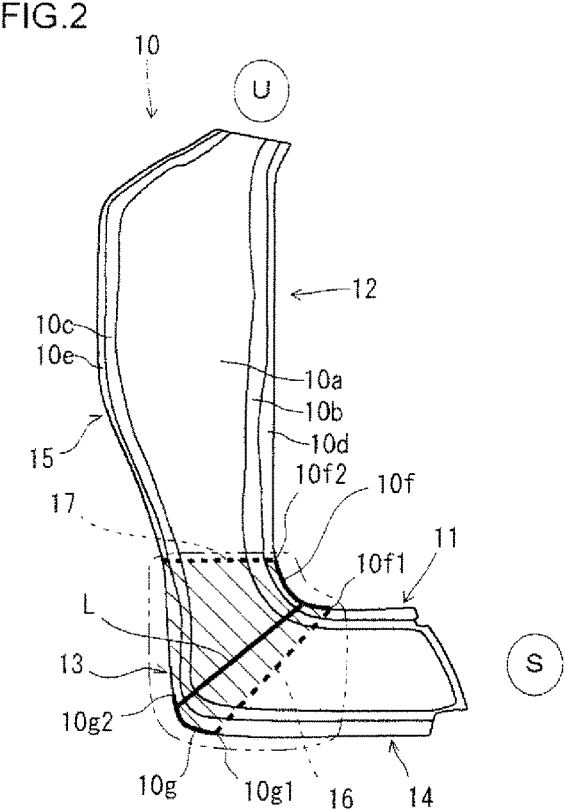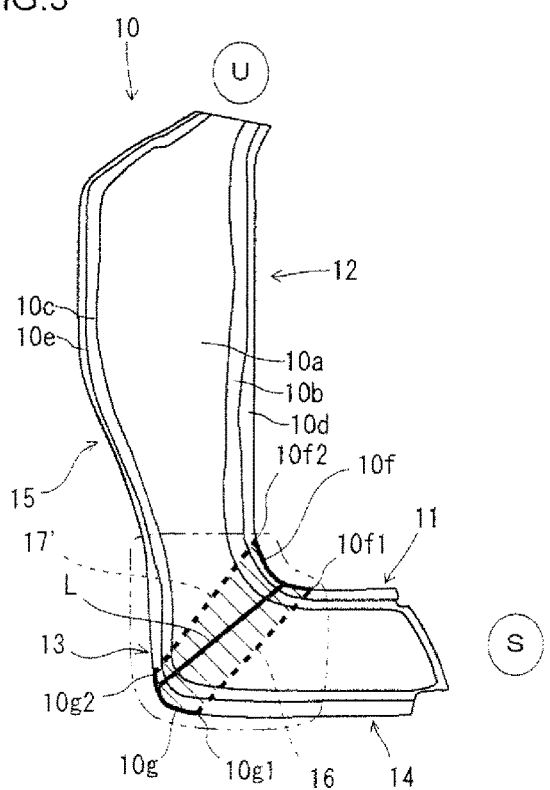

SKELETAL COMPONENT FOR AUTOMOBILE AND FRONT PILLAR LOWER INCLUDING THE SAME

TECHNICAL FIELD

The present invention relates to a skeletal component for automobile constituting an automobile body (hereafter, also simply referred to as a skeletal component), in particular relates to a skeletal component such as a front pillar lower outer that is assumed to receive a collision load in a specified direction. Furthermore, the present invention relates to a front pillar lower that includes a front pillar lower outer as a skeletal component.

BACKGROUND ART

In an automobile body, for example, a front pillar and a side sill are each a complex of skeletal components. The front pillar is arranged on a front side of the body, extending in a vertical direction. The side sill is arranged in a lower part of the body, extending in a front-back direction. A lower end portion of the front pillar and a fore end portion of the side sill are coupled to each other. Here, for a front pillar, a structure divided into upper and lower parts may be employed. In this case, a skeletal component complex as the upper part of the structure is called a front pillar upper, and a skeletal component complex as the lower part is called a front pillar lower. A lower end portion of the front pillar upper and an upper end portion of the front pillar lower are coupled to each other.

The front pillar lower includes, for example, a front pillar lower outer (hereafter, also simply referred to as an outer), a front pillar lower inner (hereafter, also simply referred to as an inner), and a front pillar lower reinforcement (hereafter, also simply referred to as a reinforcement), as skeletal components. The outer is arranged on an outer side in a car-width direction. The inner is arranged on an inner side in the car-width direction. The outer and the inner are coupled to each other, forming a closed section all over the front pillar lower in a longitudinal direction. The reinforcement is arranged between the outer and the inner to improve the strength of the front pillar lower. Among them, the outer is bent into an L shape along its longitudinal direction, and has a hat-shaped cross section all over the outer in its longitudinal direction.

FIG. 1A and FIG. 1B are schematic diagrams illustrating an example of a front pillar lower outer as a skeletal component. In these drawings, FIG. 1A is a plan view, and FIG. 1B is a cross sectional view taken along a line A-A of FIG. 1A. For ease of understanding the shape of the front pillar lower outer, in FIG. 1A, a side on which the front pillar lower outer is coupled to a side sill is denoted by reference character S, and a side on which the front pillar lower outer is coupled to a front pillar upper is denoted by reference character U. In addition, in FIG. 1A, a forward side in a traveling direction of an automobile is denoted by reference character F, and a rearward side in the traveling direction is denoted by reference character B. In FIG. 1B, an inward side in a car-width direction is denoted by reference character I, and an outward side in the car-width direction is denoted by reference character O.

As illustrated in FIG. 1A, a front pillar lower outer 10 includes a bent portion 13 that is bent into an L shape along the longitudinal direction (see a zone enclosed by a chain double-dashed line in FIG. 1A), and a first region 14 and a second region 15 that are connected to each of the opposite ends of the bent portion 13. The first region 14 extends in a straight manner from the bent portion 13 toward the rearward side B in the traveling direction of the automobile, and is coupled to the side sill. The second region 15 extends in a straight manner upward from the bent portion 13, and is coupled to the front pillar upper.

In addition, as illustrated in FIG. 1B, the cross-sectional shape of the outer 10 is in a hat shape all over the outer 10 in its longitudinal direction, namely, all over the outer 10 from the side U on which the outer 10 is coupled to the front pillar upper to the side S on which the outer 10 is coupled to the side sill. For this reason, the bent portion 13, the first region 14, and the second region 15 constituting the outer 10 each include a top panel portion 10a, a first vertical wall portion 10b, a second vertical wall portion 10c, a first flange part 10d, and a second flange part 10e. The first vertical wall portion 10b is connected to the entirety of a side portion that is the inside of the bending of either side portions of the top panel portion 10a. The second vertical wall portion 10c is connected to the entirety of a side portion that is the outside of the bending of either side portions of the lop panel portion 10a. The first flange part 10c1 is connected to the first vertical wall portion 10b. The second flange part 10e is connected to the second vertical wall portion 10c.

The front pillar lower is a skeletal component complex assumed to receive a collision load from the forward side of the body. For this reason, the front pillar lower outer 10 is a skeletal component assumed to receive a collision load along an extending direction of the first region 14 coupled to the side sill.

Japanese Patent Application Publication No. 2011-37291 (Patent Literature 1), Japanese Patent No. 5103959 (Patent Literature 2), and Japanese Patent Application Publication No. 2013-141928 (Patent Literature 3) disclose prior arts relating to the front pillar. In a front pillar of Patent Literature 1, on an inner side in a car-width direction of a pillar outer portion (equivalent to the outer) constituting a lower part in a vertical direction, a pillar reinforcing member (equivalent to the reinforcement) is attached. The pillar reinforcing member is provided in its fore portion with a high-strength portion having a strength higher than those of the other portions. Patent Literature 1 describes that this makes it possible to secure a strength required against a collision load from a forward side of a body while reducing the weight of the front pillar.

Front pillars of Patent Literature 2 and Patent Literature 3 have closed section structures. In the front pillar of Patent Literature 2, a reinforcement is constituted by an upper portion, a center portion attached on a lower side of the upper portion, and a lower portion attached on a lower side of the center portion. The attachment between the upper portion and the center portion is accomplished with end portions of both the portions overlapped. This is also the case with the attachment between the center portion and the lower portion. The bonding strength of the attachment between the center portion and the lower portion is set to be lower on a fore side than on a rear side. Patent Literature 2 describes that this makes it possible to improve the productivity of reinforcements even in the case where the reinforcements are produced from a high-tensile steel plate.

In the front pillar of Patent Literature 3, guiding means is provided by making use of a reinforcement. The guiding means has an inclined surface at a position facing a front wheel of an automobile. At the time of small offset collision, the inclined surface guides the front wheel toward the rear outer side of a body. Patent Literature 3 describes that this makes it possible to suppress deformation of the front pillar effectively while securing the stiffness of the front pillar at the time of small offset collision.

CITATION LIST

Patent Literature

Patent Literature 1: Japanese Patent Application Publication No. 2011-37291
Patent Literature 2: Japanese Patent No. 5103959
Patent Literature 3: Japanese Patent Application Publication No. 2013-141928

SUMMARY OF INVENTION

Technical Problem

As mentioned previously, a front pillar is a skeletal component complex for an automobile body, and a front pillar lower constituting a lower part of the front pillar includes an outer as a skeletal component. The front pillar lower also includes a reinforcement and an inner. For such a front pillar lower, there is a demand for weight reduction from the viewpoint of fuel efficiency, as well as a demand for an improved collision-resistance property from the viewpoint of safety.

In the front pillar of Patent Literature 1 described above, in order to secure the strength while reducing the weight, the high-strength portion is provided in the fore portion of the pillar reinforcing member. Here, when the front pillar receives a load at the time of frontal collision, part of the load is transmitted to a side sill. Since the front pillar of Patent Literature 1 includes the high-strength portion in the fore portion of the front pillar, the front pillar has tolerance for collision loads. This causes only the side sill to deform significantly without causing deformation of the front pillar deform. In this case, less energy can be absorbed by the front pillar, resulting in a decrease in collision-resistance property of the front pillar.

In the front pillar of Patent Literature 2 described above, a reinforcement is constituted by divided portions: an upper portion, a center portion, and a lower portion, which are attached with end portions of them overlapped. In the case of this front pillar, production costs increases in producing the reinforcement as the number of attachment spots and members increase. In addition, the attachment with overlapping hinders the reduction of weight.

In the front pillar patent of Literature 3 described above, the guiding means is provided by making use of the reinforcement, and at the time of small offset collision, the guiding means guides a front wheel of an automobile toward the rear outer side of the body. However, such an effect is exerted only when the front wheel turns to a traveling direction at the time of the collision, and the width of the front wheel is not excessively larger than the width of the front pillar in a car-width direction. In short, if the front wheel turns obliquely at the time of the collision, or if the width of the front wheel is large, it is difficult to expect such an effect, and the front pillar receives a load. For this reason, it is necessary to suppress the entry of a front wheel by improving the collision-resistance property of a front pillar lower even in the case where guiding means is provided in a reinforcement.

Patent Literatures 1 to 3 described above mention the improvement of the collision-resistance property and the reduction of the weight of a front pillar by modifications of the shape, plate thickness, configuration, and the like of a reinforcement. However, as to the front pillars of Patent Literatures 1 to 3 described above, no attention is paid to the shape, plate thickness, configuration, and the like of a front pillar lower outer, which is a skeletal component. There are demands for further improved collision-resistance properties and further reduced weights of from pillar lowers.

The present invention is made in such circumstances. The objective of the present invention is to provide a skeletal component for automobile and a front pillar lower that includes a front pillar lower outer as the skeletal component, the skeletal component having the following property:

Reducing the weight while improving the collision-resistance property.

Solution to Problem

A skeletal component for automobile according to an embodiment of the present invention is bent into an L shape along its longitudinal direction, and has a hat-shaped cross section all over the skeletal component in its longitudinal direction, and the skeletal component includes a bent portion that includes an arc-shaped portion on the inside of the bending and an arc-shaped portion on the outside of the bending, and a first region and a second region that extend from each of the opposite ends of the bent portion, the skeletal component being assumed to receive a collision load in the extending direction of the first region.

The skeletal component is constituted by attaching a first member that is arranged on the first region side and a second member that is arranged on the second region side.

An attachment line of the first member and the second member is arranged in a predetermined zone between a first boundary on the first region side and a second boundary on the second region side.

The first boundary is a straight line that connects an end, on the first region side, of the arc-shaped portion on the inside of the bending, and an end, on the first region side, of the arc-shaped portion on the outside of the bending.

The second boundary is a straight line that runs from an end, on the second region side, of the arc-shaped portion on the inside of the bending along the extending direction of the first region.

The plate thickness of the first member is larger than the plate thickness of the second member.

In the skeletal component for automobile described above, it is preferable that the second boundary is a straight line that connects an end, on the second region side, of the arc-shaped portion on the inside of the bending, and an end, on the second region side, of the arc-shaped portion on the outside of the bending.

In the skeletal component for automobile described above, it is preferable that a ratio $t_1/t_2$ between a plate thickness $t_1$ of the first member and a plate thickness $t_2$ of the second member is 1.2 or more.

In the skeletal component for automobile described above, it is preferable that the skeletal component is a front pillar lower outer, the first region is coupled to a side sill, and the second region is coupled to a front pillar upper. A front pillar lower according to an embodiment of the present invention includes the front pillar lower outer.

Advantageous Effects of Invention

The skeletal component for automobile according to the present invention and a front pillar lower that includes a front pillar lower outer as the skeletal component have the following remarkable advantageous effect:

Reducing the weight while improving the collision-resistance property.

BRIEF DESCRIPTION OF DRAWINGS

FIG. 1A is a plan view schematically illustrating an example of a front pillar lower outer, as a skeletal component.

FIG. 1B is a cross sectional view taken along a line A-A of FIG. 1A.

FIG. 2 is a plan view schematically illustrating an example of a from pillar lower outer, as a skeletal component according to the present embodiment.

FIG. 3 is a plan view illustrating a more preferable range for a predetermined zone where an attachment line is arranged.

DESCRIPTION OF EMBODIMENTS

Figure 4:
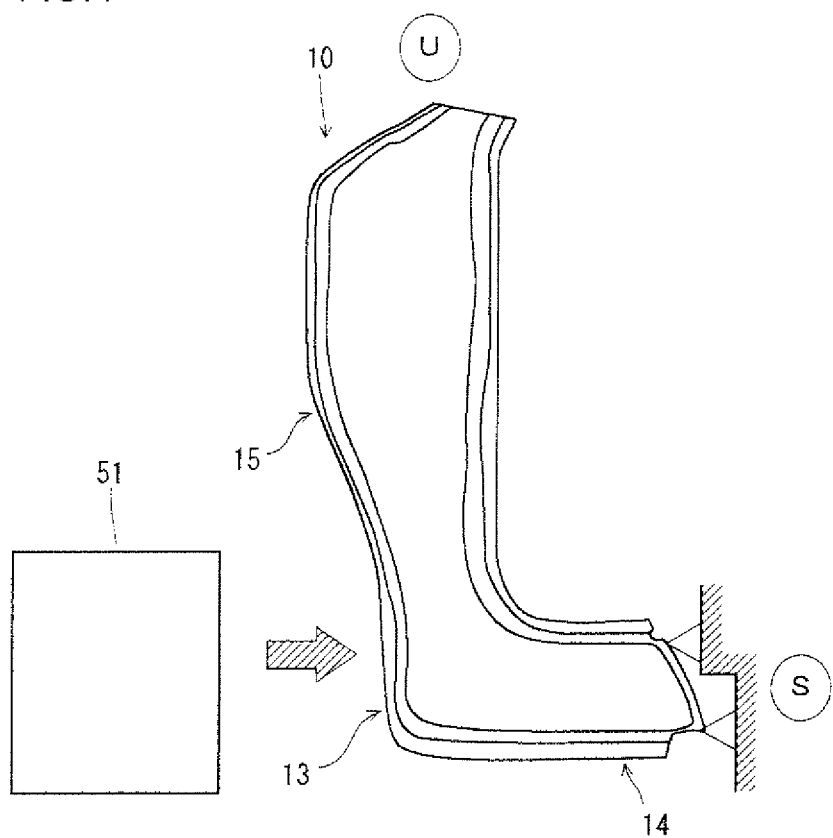
FIG. 4 is a plan view schematically illustrating the outline of a collision test.

To achieve the above objective, the present inventors conducted intensive studies through a variety of tests. As a result, the following findings were obtained.

For example, in the case of a front pillar lower outer, increasing the plate thickness thereof enables the suppression of entry of a front wheel at the time of frontal collision, and thus it is possible to improve the collision-resistance property of a front pillar lower. However, only simply increasing the plate thickness results in an increase in mass of the front pillar lower outer accordingly, hindering the reduction of weight. Considering the above, the compatibility between the collision-resistance property and the weight reduction is needed.

The front pillar lower outer is bent into an L shape along its longitudinal direction. The cross-sectional shape of the front pillar lower outer is in a hat shape all over the front pillar lower outer in the longitudinal direction. In the case of such an outer, in order to withstand a collision load imposed by a front wheel at the time of frontal collision, the axial crushing performance of a first region may need to be increased along mainly the front-back direction of a body, namely a direction in which a side sill extends. For this reason, an effective configuration of the outer has the plate thickness which is larger on a first region side that is coupled to the side sill than on a second region side that is coupled to a front pillar upper.

Here, a configuration is effective in which a first member is arranged on the first region side, a second member having a plate thickness than that of the second member is arranged on the second region side, and these first member and second member. Then, an attachment line between the first member and the second member may be arranged in a predetermined zone of a bent portion connecting the first region and the second region. This enables the compatibility between the collision-resistance property and the weight reduction.

Hereafter, an embodiment of the present invention will be described with reference to the drawings. Here, as a skeletal component for automobile, a front pillar lower outer that constitutes a front pillar lower will be described by way of example.

FIG. 2 is a plan view schematically illustrating an example of a front pillar lower outer, as a skeletal component according to the present embodiment. A front pillar lower outer 10 according to the present embodiment illustrated in FIG. 2 has, as with the front pillar lower outer illustrated in FIG. 1, a hat-shaped cross section all over the front pillar lower outer 10 in its longitudinal direction (see FIG. 1B described above).

As illustrated in FIG. 2, the front pillar lower outer 10 is bent into an L shape along its longitudinal direction. The outer 10 includes a bent portion 13 that is bent into the L shape along its longitudinal direction (see a zone enclosed by a chain double-dashed line in FIG. 2), and a first region 14 and a second region 15 that are connected to each of the opposite ends of the bent portion 13. The first region 14 extends in a straight manner from the bent portion 13 toward the rearward side in the traveling direction of an automobile, and is coupled to the side sill. The second region 15 extends in a straight manner upward from the bent portion 13, and is coupled to a front pillar upper. The outer 10 is a skeletal component assumed to receive a collision load along an extending direction of the first region 14 coupled to the side sill.

The outer 10 is constituted by attaching the first member 11 and the second member 12. The attachment of the first member 11 and the second member 12 can be performed by, for example, butt welding. The first member 11 is arranged on a first region 14 side, namely on a side sill side. The second member 12 is arranged on a second region 15 side, namely on a front pillar upper side. The reason for constituting the outer 10 in this way with the first member 11 and the second member 12 is to make the plate thickness of the front pillar lower outer 10 differ between the side sill side and the front pillar upper side.

In the outer 10 according to the present embodiment, the plate thickness of the first member 11 on the side sill side (first region 14 side) is larger than the plate thickness of the second member 12 on the front pillar upper side (second region 15 side). Since the plate thickness on the first region 14 side coupled to the side sill is made larger, the axial crushing performance of the first region 14 is increased. This can improve the collision-resistance property of the outer 10 with high efficiency. Meanwhile, since the plate thickness on the second region 15 side coupled to the front pillar upper is smaller, it is possible to achieve the weight reduction. This does not interfere with the collision-resistance property because the plate thickness on the second region 15 side contributes less to the axial crushing performance of the first region 14.

In order to exert the above effects, an attachment line L between the first member 11 and the second member 12 is arranged in a predetermined zone that is specified in the bent portion 13. This predetermined zone is a zone between a first boundary 16 on the first region 14 side and a second boundary 17 on the second region 15 side. The specific mode thereof will be described below.

The bent portion 13 includes an arc-shaped portion 10$f$ on the inside of the bending (see a bold line portion in FIG. 2) and an arc-shaped portion 10$g$ on the outside of the bending (see a bold line portion in FIG. 2). The arc-shaped portion 10$f$ on the inside of the bending refers to an arc-shaped edge portion on the inside of the bending of the first flange part 10$d$. The arc-shaped portion 10$g$ on the outside of the bending refers to an arc-shaped edge portion on the outside of the bending of the second flange part 10$d$.

A first boundary 16 is a straight line that connects an end 10$f$1, on the first region 14 side, of the arc-shaped portion 10$f$ on the inside of the bending, and an end 10$g$1, on the first region 14 side, of the arc-shaped portion 10$g$ on the outside of the bending (see a bold dotted line in FIG. 2). A second boundary 17 is a straight line that runs from an end 10$f$2, on the second region 15 side, of the arc-shaped portion 10$f$ on the inside of the bending along the extending direction of the first region 14 (see a bold line in FIG. 2). The attachment line L of the first member 11 and the second member 12 is arranged in a predetermined zone between such a first boundary 16 and second boundary 17 (see in the hatched zone in FIG. 2). By arranging the attachment line L in the predetermined zone of the bent portion 13 in this way, it is possible to achieve the weight reduction of the outer 10 while maintaining the collision-resistance property.

If the attachment line L is arranged to be closer to the side sill side (first region 14 side) than the first boundary 16, a zone on the first region 14 side, which has a large plate thickness, is narrowed. In this case, the axial crushing performance of the first region 14 decreases, resulting in a decrease in collision-resistance property of the outer 10. On the other hand, if the attachment line L is arranged to be closer to the front pillar upper side (second region 15 side) than the second boundary 17, a zone having a large plate thickness is widened to the second region 15 side, and thus a little improvement of the collision-resistance property is expected. However, in this case, the axial crushing performance of the first region 14 hardly changes because there is no change in the plate thickness of the first region 14. This rather hinders the weight reduction significantly due to widening the zone having a large plate thickness.

FIG. 3 is a plan view illustrating a more preferable range for the predetermined zone where the attachment line is arranged. As illustrated in FIG. 3, it is preferable that a second boundary 17' is a straight line that connects an end 10$f$2, on the second region 15 side, of the arc-shaped portion 10$f$ on the inside of the bending, and an end 10$g$2, on the second region 15 side, of the arc-shaped portion 10$g$ on the outside of the bending (see a bold dotted line in FIG. 3). The attachment line L of the first member 11 and the second member 12 is arranged in a predetermined zone between such a first boundary 16 and second boundary 17' (see in the hatched zone in FIG. 3). This enables the securement of the collision-resistance property of the outer 10 while achieving further weight reduction.

In the outer 10 according to the present embodiment, the plate thickness on the first region 14 side coupled to the side sill is made larger, which makes the axial crushing performance increased, enabling the improvement of the collision-resistance property with high efficiency. Moreover, since the plate thickness on the second region 15 side coupled to the front pillar upper is smaller, it is possible to achieve the weight reduction. Therefore, the compatibility between the collision-resistance property and the weight reduction is enabled.

In addition, the outer 10 according to the present embodiment, the attachment line L between the first member 11 and the second member 12 is arranged in the predetermined zone that is specified in the bent portion 13. This can improve stock utilization for the outer 10 as compared with the case where the attachment line L is arranged in a straight-shaped portion of the first region 14 (side sill side) or the second region 15 (front pillar upper side).

In the outer 10 according to the present embodiment, the plate thickness on the first region 14 side coupled to the side sill is made larger, which makes the axial crushing performance increased. For this reason, there is no case where only the side sill significantly deforms at the time of frontal collision as with the front pillar of Patent Literature 1 described above, and it is possible to cause the front pillar lower and the side sill to deform in a good balance to absorb a collision load. In addition, the improvement of the collision-resistance property is not limited at the time of small offset collision as in the case of Patent Literature 3 described above, and it is possible to improve the collision-resistance property even when a front wheel turns obliquely at the time of collision or when the front wheel has a large width.

Preferably, a ratio t1/t2 between a plate thickness t1 (mm) of the first member and a plate thickness t2 (mm) of the second member is 1.2 or more. This enables further improvement of the collision-resistance property, enabling the achievement of the weight reduction. The upper limit of the plate thickness ratio t1/t2 is not specified. However, when the plate thickness ratio t1/t2 exceeds 2.0, the attachment by butt welding or the like becomes difficult. For this reason, the plate thickness ratio is preferably set to 2.0 or less.

The front pillar lower outer according to the present embodiment is a press formed product. The components thereof, the first member and the second member, may be attached before press forming or after press forming. In a method for producing the outer by the former scheme, a so-called tailored blank is used. In this case, the tailored blank is obtained by subjecting a first blank (metal plate) and a second blank (metal plate) that have plate thicknesses different from each other, to butt welding. Press forming is performed on this tailored blank, whereby a formed product of the outer can be obtained. As necessary, the formed product is finished by trimming, restriking, and the like.

In contrast, in a method for producing the outer by the latter scheme, press forming is performed on a first blank (metal plate) to obtain a first member formed into a desired shape. Separately, press forming is performed on a second blank (metal plate) to obtain a second member formed into a desired shape. The first member and the second member are attached by butt welding, whereby the outer can be obtained. In this case, trimming, restriking, and the like are performed, as necessary, on the first member and the second member before the attachment, or on the complex after the attachment.

The front pillar lower according to the present embodiment includes the outer according to the present embodiment described above. This front pillar lower is a closed section structure and includes also a reinforcement and an inner. For this reason, the collision-resistance property is improved by the reinforcement as well as the outer, and the achievement of the weight reduction also becomes possible. Furthermore, since the stock utilization for the outer is improved, it is possible to reduce production costs of front pillar lowers.

The present invention is not limited to the embodiments described above, and various modifications may be made without departing from the spirit and scope of the present invention. For example, the skeletal component is not limited to a front pillar lower outer, and may be a rear-side outer or the like as long as it is a component that is bent into an L shape along its longitudinal direction and assumed to receive a collision load along the extending direction of the first region. In addition, each of the first member and the second member constituting the skeletal component does not necessary have a constant thickness.

EXAMPLES

[Collision Test]

For the front pillar lower outer according to the present embodiment, a test for confirming a collision-resistance property at the time of frontal collision was conducted by the FEM analysis.

FIG. 4 is a plan view schematically illustrating the outline of the collision test. FIG. 4 illustrates a front pillar lower outer 10, and an impactor 51. In the collision test by the FEM analysis, a free end portion of the first region 14 of the outer 10, namely the free end portion on the side sill side was fixed to restrain the displacement of the free end portion. In this state, the impactor 51 was caused to move at a speed of 15 km/h in a horizontal direction and collided with the bent portion 13 of the outer 10. Then, the impactor 51 was caused to stop at the time when the amount of entry of the impactor 51 into the outer 10 reached 100 mm.

At this point, an energy absorbed by the outer 10 with the entry of the impactor 51 into the outer 10 was determined. This energy absorbed by the outer 10 was divided by the volume of the outer 10, whereby an absorbed energy per unit volume was calculated.

Figure 5A:
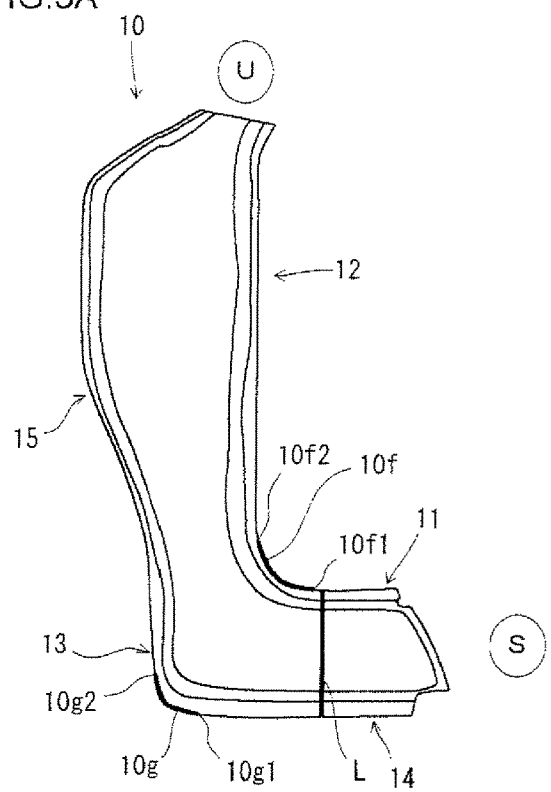
FIG. 5A is a plan view illustrating a front pillar lower outer of Comparative Example 1 used in the collision test.
Figure 5B:
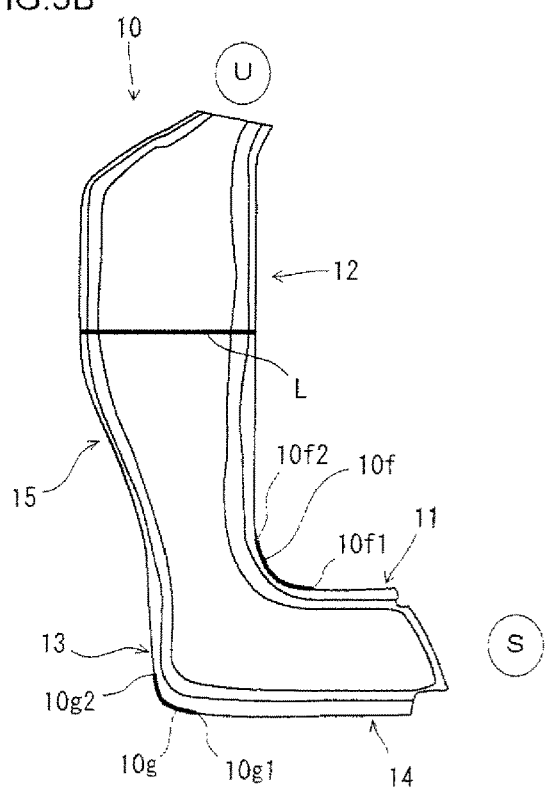
FIG. 5B is a plan view illustrating a front pillar lower outer of Comparative Example 2 used in the collision test.
Figure 5C:
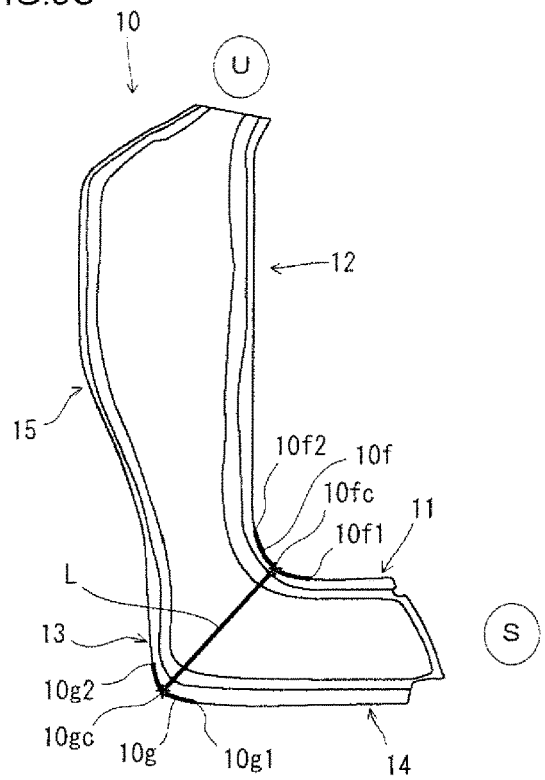
FIG. 5C is a plan view illustrating a front pillar lower outer of Inventive Example of the present invention 1 used in the collision test.
Figure 5D:
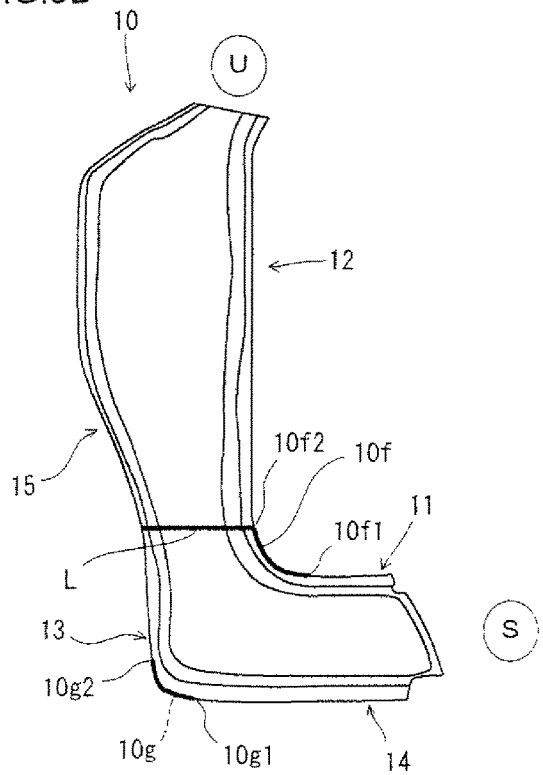
FIG. 5D is a plan view illustrating a front pillar lower outer of Inventive Example of the present invention 2 used in the collision test.
Figure 5E:
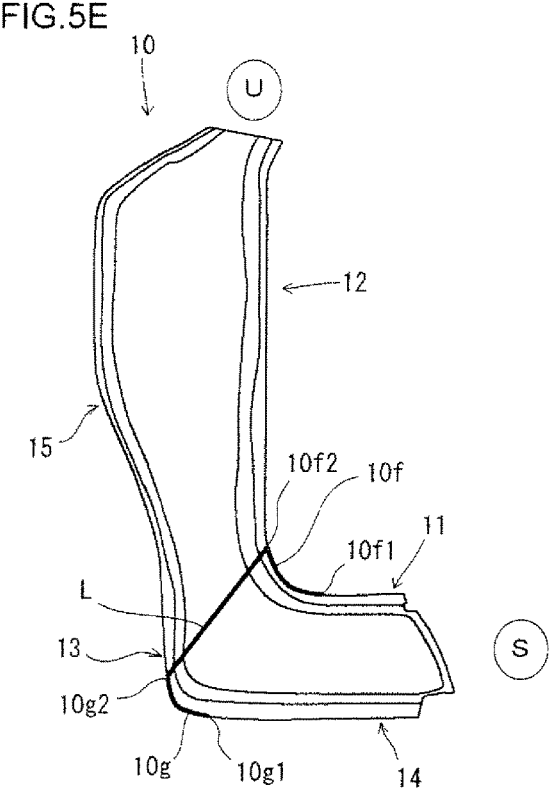
FIG. 5E is a plan view illustrating a front pillar lower outer of Inventive Example of the present invention 3 used in the collision test.
Figure 5F:
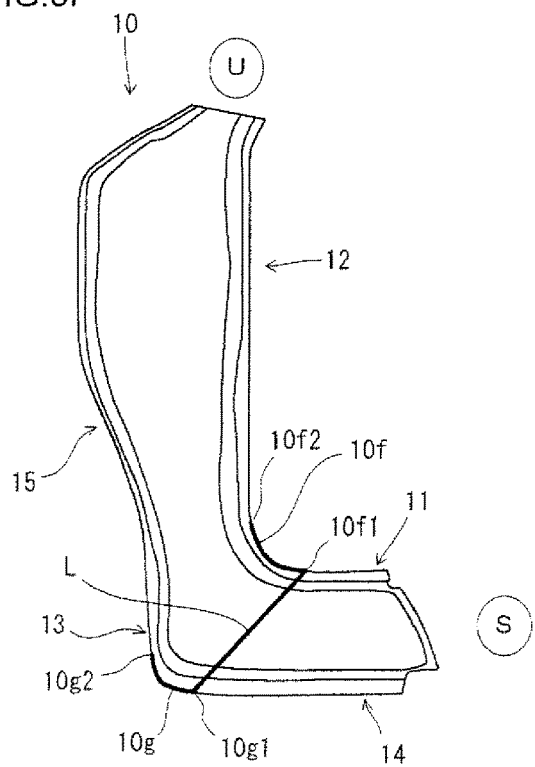
FIG. 5F is a plan view illustrating a front pillar lower outer of Inventive Example of the present invention 4 used in the collision test.

FIG. 5A to FIG. 5F are plan views illustrating front pillar lower outers used in the collision test. In these drawings, FIG. 5A and FIG. 5B illustrate Comparative Examples 1 and 2, respectively. FIG. 5C, FIG. 5D, FIG. 5E, and FIG. 5F illustrates Inventive Examples of the present invention 1, 2, 3, and 4, respectively.

In Comparative Examples 1 and 2, and Inventive Examples of the present invention 1 to 4, the attachment line L was arranged at the following positions.

Comparative Example 1 (see FIG. 5A): in a straight-shaped portion of the first region 14 (on the side sill side)

Comparative Example 2 (see FIG. 5B): in a straight-shaped portion of the second region 15 (on the front pillar upper side)

Inventive Example of the present invention 1 (see FIG. 5C): on a straight line that connects a center 10$fc$ of the arc-shaped portion 10$f$ on the inside of the bending, and a center 10$gc$ of the arc-shaped portion 10$g$ on the outside of the bending Inventive Example of the present invention 2 (see FIG. 5D): on a straight line that runs from an end 10$f2$, on the second region 15 side, of the arc-shaped portion 10$f$ on the inside of the bending along the extending direction of the first region 14

Inventive Example of the present invention 3 (see FIG. 5E): on a straight line that connects the end 10$f2$, on the second region 15 side, of the arc-shaped portion 10$f$ on the inside of the bending, and an end 10$g2$, on the second region 15 side, of the arc-shaped portion 10$g$ on the outside of the bending Inventive Example of the present invention 4 (see FIG. 5F): on a straight line that connects an end 10$f1$ on the first region 14 side, of the arc-shaped portion 10$f$ on the inside of the bending, and an end 10$g1$, on the first region 14 side, of the arc-shaped portion 10$g$ on the outside of the bending In each of Inventive Examples of the present invention 1 to 4, and Comparative Examples 1 and 2, the first member 11 on the first region 14 side (side sill side) was formed of a metal plate A, and the second member 12 on the second region 15 side (front pillar upper side) was formed of a metal plate B. The metal plate A was a high-tensile steel plate equivalent to JAC780Y of The Japan Iron and Steel Federation Standard (JFS Standard), and the plate thickness t1 thereof was 1.5 mm. The metal plate B was a high-tensile steel plate equivalent to JAC980Y of The Japan Iron and Steel Federation Standard (JFS Standard), and the plate thickness t2 thereof was 1.2 mm. The plate thickness ratio t1/t2 was 1.25.

Figure 6A:
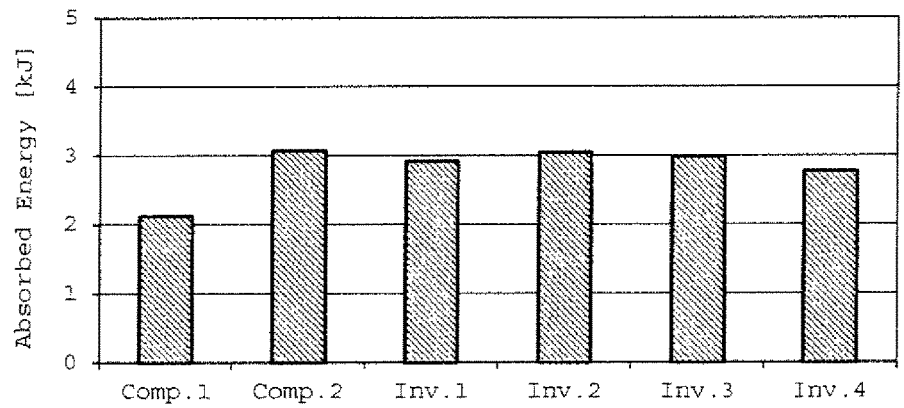
FIG. 6A is a drawing illustrating the results of the test, illustrating absorbed energies in the collision test.
Figure 6B:
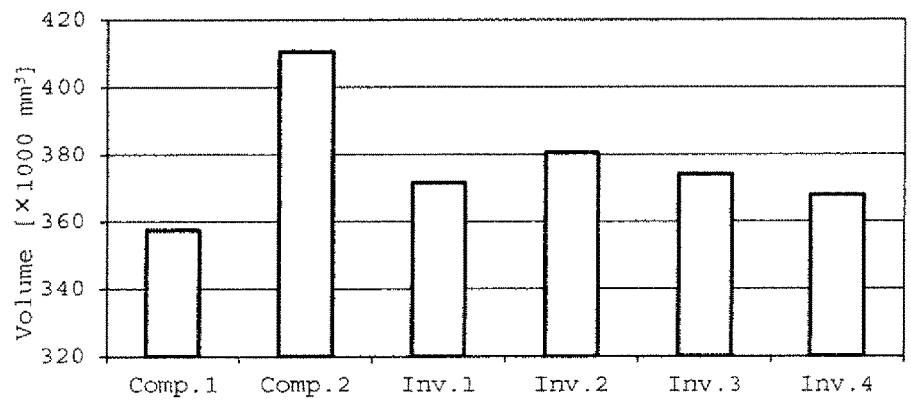
FIG. 6B is a drawing illustrating the results of the test, illustrating the volumes of the outers.
Figure 6C:
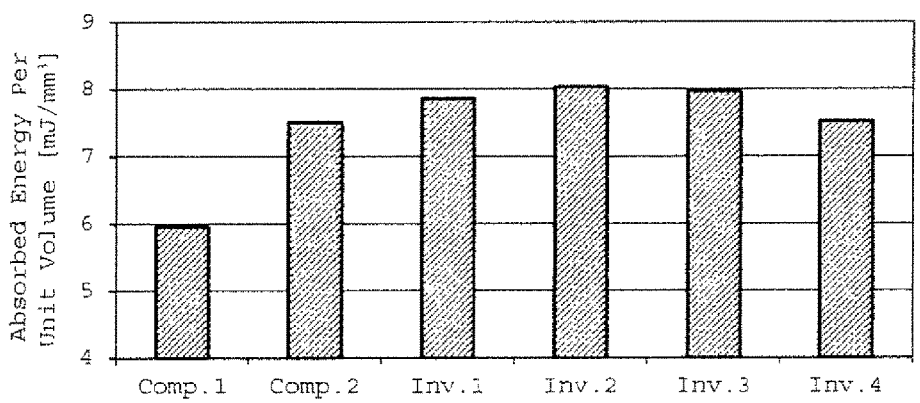
FIG. 6C is a drawing illustrating the results of the test, illustrating absorbed energies per unit volume.

FIG. 6A to FIG. 6C are drawings illustrating the results of the test. In these drawings, FIG. 6A illustrates absorbed energies in the collision test. FIG. 6B illustrates volumes of the outers. FIG. 6C illustrates absorbed energies per unit volume. From the results of FIG. 6A to FIG. 6C, the following facts are shown.

As illustrated in FIG. 6A, in Comparative Example 1, since the attachment line was arranged in the straight-shaped portion on the side sill side, the absorbed energy was poor. In contrast, in Inventive Examples of the present invention 1 to 4, since the attachment lines were arranged in the predetermined zone specified in the present embodiment, the absorbed energy was good. In addition, in Comparative Example 2, since the attachment line was arranged in the straight-shaped portion on the front pillar upper side, the absorbed energy was good.

Here, the absorbed energy in the collision test varies according to the plate thickness, and the absorbed energy tends to increase as a zone having a large plate thickness is widened. For this reason, the absorbed energy of Comparative Example 2 was slightly better than the absorbed energies of Inventive Examples of the present invention 1 to 4.

As illustrated in FIG. 6B, the outer of Comparative Example 2 had a significantly large volume. For this reason, as illustrated in FIG. 6C, as to the absorbed energy per unit volume, Inventive Examples of the present invention 1 to 4 were better than Comparative Example 2. In short, from the results illustrated in FIG. 6B, the outers of Inventive Examples of the present invention 1 to 4 had weights significantly lighter than that of Comparative Example 2. Therefore, it was clarified that the outer according to the present embodiment is good from the viewpoint of compatibility between the weight reduction and the collision-resistance property in a good balance.

[Stock Utilization]

In the case where the front pillar lower outer according to the present embodiment was formed from a tailored blank, the stock utilization for the blank was investigated.

Figure 7A:
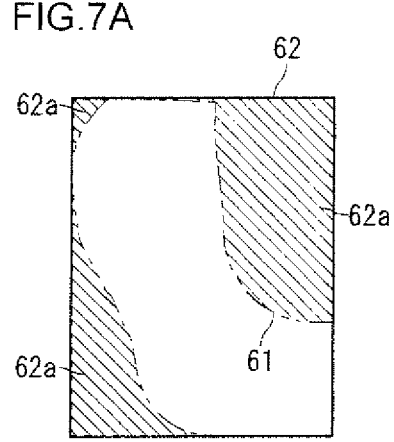
FIG. 7A is a schematic diagram illustrating the shape of a blank as Comparative Example 3 used in press forming, the shapes of metal plates before trim processing used for the fabrication of the blank.
Figure 7B:
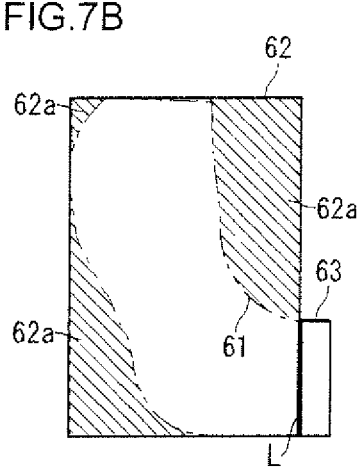
FIG. 7B is a schematic diagram illustrating the shape of a blank as Comparative Example 4 used in press forming, the shapes of metal plates before trim processing used for the fabrication of the blank.
Figure 7C:
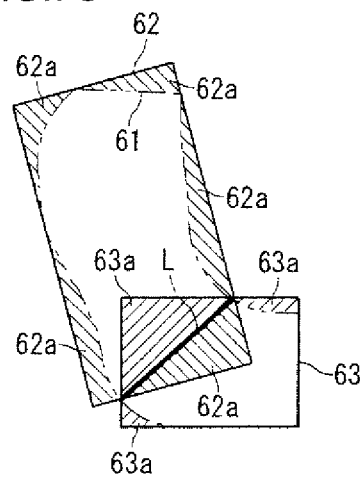
FIG. 7C is a schematic diagram illustrating the shape of a blank as Inventive Example of the present invention 5 used in press forming, the shapes of metal plates before trim processing used for the fabrication of the blank.
Figure 7D:
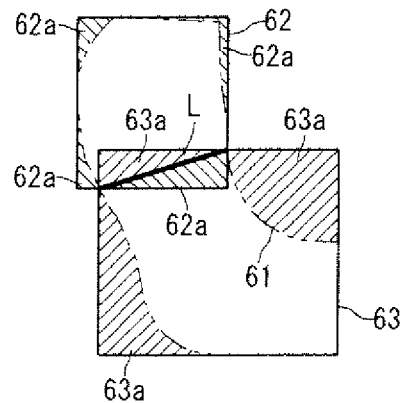
FIG. 7D is a schematic diagram illustrating the shape of a blank as Comparative Example 5 used in press forming, the shapes of metal plates before trim processing used for the fabrication of the blank.

FIG. 7A to FIG. 7D are schematic diagrams illustrating the shapes of blanks used in press forming, the shapes of metal plates before trim processing used for the fabrication of the blanks. In these drawings, FIG. 7A, FIG. 7B, and FIG. 7D illustrate Comparative Examples 3, 4, and 5, respectively. FIG. 7C illustrates Inventive Example of the present invention 5. In each of FIG. 7A to FIG. 7D, the shape of a blank 61 used in press forming is illustrated by chain double-dashed lines, the shapes of a first metal plate 62 and a second metal plate 63 before the trim processing used in the fabrication of the blank 61 is illustrated by solid lines, and the attachment line L is illustrated by a bold line. Both of the first metal plate 62 and the second metal plate 63 before the trim processing were formed into a rectangular shape. A zone 62a in the first metal plate 62 to be removed in the trim processing and a zone 63a in the second metal plate 63 to be removed in the trim processing are hatched.

As illustrated in FIG. 7A, in Comparative Example 3, a single metal plate (the first metal plate 62) was used as a blank for press forming, rather than a tailored blank. As illustrated in FIG. 7B, in Comparative Example 4, the attachment line L was arranged in the straight-shaped portion on the side sill side. As illustrated in FIG. 7D, in Comparative Example 5, the attachment line L was arranged in the straight-shaped portion on the front pillar upper side. In contrast, as illustrated in FIG. 7C, in Inventive Example of the present invention 5, attachment line L was arranged in the predetermined zone specified in the present embodiment.

Figure 8:
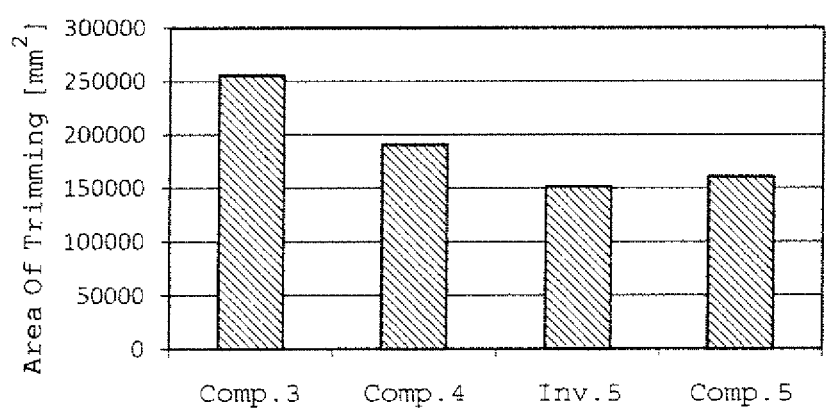
FIG. 8 is a diagram illustrating the areas of blanks removed in the trim processing for Inventive Example of the present invention 5, and Comparative Examples 3 to 5.

FIG. 8 is a diagram illustrating the areas of blanks removed in the trim processing for Inventive Example of the present invention 5, and Comparative Examples 3 to 5. As illustrated in FIG. 8, Inventive Example of the present invention 5 had the least removal area of blank. Therefore, it was clarified that, with the outer according to the present embodiment, it is possible to improve the stock utilization of a blank.

INDUSTRIAL APPLICABILITY

The present invention is effectively applicable to a skeletal component for automobile, and a front pillar lower including a front pillar lower outer as the skeletal component.

REFERENCE SIGNS LIST

10: front pillar lower outer (skeletal component),
10a: top panel portion,
10b: first vertical wall portion,
10c: second vertical wall portion,
10d: first flange part, 10e: second flange part.
10f: arc-shaped portion on inside of bending.
10f1: end on first region of arc-shaped portion on inside of bending,
10f2: end on second region of arc-shaped portion on inside of bending,
10fc: center of arc-shaped portion on inside of bending,
10g: arc-shaped portion on outside of bending,
10g1: end on first region of arc-shaped portion on outside of bending,
10g2: end on second region of arc-shaped portion on outside of bending,
10gc: center of arc-shaped portion on outside of bending,
11: first member,
12: second member,
13: bent portion,
14: first region,
15: second region,
16: first boundary,
17, 17': second boundary,
51: impactor,
61: blank,
62: first metal plate,
62a: zone in first metal plate to be removed by trim,
63: second metal plate,
63a: zone in second metal plate to be removed by trim,
L: attachment line

The invention claimed is:

1. A skeletal component for automobile that is bent into an L shape along its longitudinal direction, and has a hat-shaped cross section all over skeletal component in its longitudinal direction, wherein
the skeletal component comprises a bent portion that includes an arc-shaped portion on an inside of bending and an arc-shaped portion on an outside of the bending, and a first region and a second region that extend from each of opposite ends of the bent portion, the skeletal component configured to receive a collision load in an extending direction of the first region,
the skeletal component is constituted by directly attaching a first member that is arranged on the first region side and a second member that is arranged on the second region side,
an attachment line of the first member and the second member is arranged in a predetermined zone between a first boundary on the first region side and a second boundary on the second region side,
the first boundary is a straight line that connects an end, on the first region side, of the arc-shaped portion on the inside of the bending, and an end, on the first region side, of the arc-shaped portion on the outside of the bending,
the second boundary is a straight line that runs from an end, on the second region side, of the arc-shaped portion on the inside of the bending along the extending direction of the first region, and
a plate thickness of the first member is larger than a plate thickness of the second member.

2. The skeletal component for automobile according to claim 1, wherein
a ratio (t1/t2) between a plate thickness (t1) of the first member and a plate thickness (t2) of the second member is 1.2 or more.

3. The skeletal component for automobile according to claim 2, wherein
the skeletal component is a front pillar lower outer, and the first region is coupled to a side sill, and the second region is coupled to a front pillar upper.

4. A front pillar lower comprising the skeletal component for automobile according to claim 3.

5. The skeletal component for automobile according to claim 1, wherein
the skeletal component is a front pillar lower outer, and
the first region is coupled to a side sill, and the second region is coupled to a front pillar upper.

6. A front pillar lower comprising the skeletal component for automobile according to claim 5.

7. A skeletal component for automobile that is bent into an L shape along its longitudinal direction, and has a hat-shaped cross section all over skeletal component in its longitudinal direction, wherein
the skeletal component comprises a bent portion that includes an arc-shaped portion on an inside of bending and an arc-shaped portion on an outside of the bending, and a first region and a second region that extend from each of opposite ends of the bent portion, the skeletal component configured to receive a collision load in an extending direction of the first region,
the skeletal component is constituted by attaching a first member that is arranged on the first region side and a second member that is arranged on the second region side,
an attachment line of the first member and the second member is arranged in a predetermined zone between a first boundary on the first region side and a second boundary on the second region side,
the first boundary is a straight line that connects an end, on the first region side, of the arc-shaped portion on the inside of the bending, and an end, on the first region side, of the arc-shaped portion on the outside of the bending,
the second boundary is a straight line that connects an end, on the second region side, of the arc-shaped portion on the inside of the bending, and an end, on the second region side, of the arc-shaped portion on the outside of the bending, and
a plate thickness of the first member is larger than a plate thickness of the second member.

8. The skeletal component for automobile according to claim 7, wherein
a ratio (t1/t2) between a plate thickness (t1) of the first member and a plate thickness (t2) of the second member is 1.2 or more.

9. The skeletal component for automobile according to claim 8, wherein
the skeletal component is a front pillar lower outer, and
the first region is coupled to a side sill, and the second region is coupled to a front pillar upper.

10. A front pillar lower comprising the skeletal component for automobile according to claim 9.

11. The skeletal component for automobile according to claim 7, wherein
the skeletal component is a front pillar lower outer, and
the first region is coupled to a side sill, and the second region is coupled to a front pillar upper.

12. A front pillar lower comprising the skeletal component for automobile according to claim 11.

* * * * *